United States Patent
Johnston et al.

(10) Patent No.: US 6,172,151 B1
(45) Date of Patent: *Jan. 9, 2001

(54) NONAQUEOUS DRAG REDUCING SUSPENSIONS

(75) Inventors: Ray L. Johnston; Yung N. Lee, both of Ponca City, OK (US)

(73) Assignee: Conoco Inc., Ponca City, OK (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/927,911

(22) Filed: Sep. 11, 1997

Related U.S. Application Data

(60) Provisional application No. 60/028,126, filed on Oct. 15, 1996.

(51) Int. Cl.$^7$ .................................. C08J 5/05; C08J 5/06

(52) U.S. Cl. ..................... 524/379; 524/207; 524/275; 524/284; 524/376; 524/377; 524/388; 524/389; 524/570; 524/579; 524/232; 523/207

(58) Field of Search ..................................... 524/379, 275, 524/570, 579, 232, 284, 376, 377, 388, 389; 523/207

(56) References Cited

U.S. PATENT DOCUMENTS

| | | | |
|---|---|---|---|
| 3,645,822 | * 2/1972 | Widiger et al. | 156/243 |
| 3,843,589 | * 10/1974 | Wartman | 260/33.4 R |
| 4,190,069 | * 2/1980 | Krantz | 137/13 |
| 4,433,123 | 2/1984 | Mack | 526/139 |
| 4,584,244 | 4/1986 | Fenton | 428/407 |
| 4,720,397 | 1/1988 | O'Mara et al. | 427/180 |
| 4,826,728 | 5/1989 | O'Mara et al. | 428/407 |
| 4,837,249 | 6/1989 | O'Mara et al. | 523/175 |
| 5,244,937 | 9/1993 | Lee et al. | 523/204 |
| 5,376,697 | * 12/1994 | Johnston et al. | 523/175 |
| 5,449,732 | 9/1995 | Smith et al. | 526/348.3 |
| 5,504,131 | 4/1996 | Smith et al. | 524/401 |
| 5,504,132 | 4/1996 | Smith et al. | 524/401 |
| 5,539,044 | 7/1996 | Dindi et al. | 524/570 |

\* cited by examiner

*Primary Examiner*—David W. Wu
*Assistant Examiner*—Caixia Lu
(74) *Attorney, Agent, or Firm*—Cortlan R. Schupbach; Hsiang-ning Sun

(57) ABSTRACT

This invention relates to improving the flow of flowing streams of hydrocarbons, such as petroleum or finished products, in a conduit such as a pipeline. The present invention also relates to a stable, nonagglomerating nonaqueous suspension suitable for improving flow of hydrocarbons in conduits, particularly finished product hydrocarbons in conduits.

22 Claims, No Drawings

NONAQUEOUS DRAG REDUCING SUSPENSIONS

This application is a continuation-in-part of provisional application entitled "Nonaqueous Drag Reducing Suspension" with Ser. No. 60/028,126 and filed Oct. 15, 1996. The provisional application is hereby incorporated by reference.

FIELD OF THE INVENTION

This invention relates to improvement of flow of hydrocarbons, whether crude oil or refined products, in constricted conduits such as pipelines. The invention finds application both in science and industry, such as the oil industry.

It is well known in the art that certain polymers which are oil soluble may be polymerized in the presence of catalysts to produce high molecular weight, non-crystalline, hydrocarbon soluble polymers by various means. These polymers when dissolved in a hydrocarbon fluid flowing through a conduit greatly reduce turbulent flow and decrease "drag", thus reducing the amount of horsepower needed to move a given volume of hydrocarbon, or conversely enable greater volumes of fluid to be moved with a given amount of power. In short, these polymers are drag reducers or flow improvers for hydrocarbon fluids.

It is of particular interest to note that the high molecular weight polymers known as drag reducers are used in very dilute solutions ranging up to about 100 parts per million in the hydrocarbon flowing through the conduit. These materials display useful flow characteristics not present in the commonly known crystalline, largely non-hydrocarbon soluble artifact-forming polymers such as polyethylene and polypropylene. In contrast, the hydrocarbon soluble materials of the present invention are noted for their effectiveness as anti-misting agents and drag reducing agents.

As is known in the art, these polymers are susceptible to shear degradation when dissolved in the hydrocarbons in which drag is being reduced. Thus passage through a pump, severe constrictions in a conduit or the like which produce excessive turbulent flow leads to degradation of the polymer, which thereafter has reduced effectiveness. Consequently, it is important that these materials be placed into the flowing hydrocarbon stream in a form which achieves certain desirable features.

First, the polymer should be placed in a form adequate for easy transportation and handling without exotic or unusual equipment, since injection points for the polymer into the flowing hydrocarbon stream can often be at remote and inaccessible locations and require the movement of material to such locations. Secondly, the polymer must be in a form which dissolves rapidly in the hydrocarbon being transported, since the polymers have little drag reducing effect until solubilized into the hydrocarbon stream. Third, the hydrocarbon should also be innocuous to the ultimate purpose of the hydrocarbon fluid. For example, in the case of crude oil flowing through a pipeline, larger amounts of water and contaminants can be tolerated than in finished pipeline products such as diesel fuel, gasoline, and jet fuel which are ultimately destined to be burned in internal combustion engines and turbine engines.

Currently, a number of different commercial approaches are being taken to the problem of preparing, dissolving, transporting and using such drag reducing polymers. In use, the polymers form extremely dilute solutions ranging from about 1 to up to about 100 parts per million polymer and hydrocarbon, yet remain effective in order to receive drag reduction or anti-misting. A common commercial method is to prepare the polymer in dilute solutions in an inert solvent such as kerosene or other solvating material as set forth in Mack, U.S. Pat. No. 4,433,123. In this reference, Mack utilizes a solution of high molecular weight polymer suitable for use as a drag reducing agent when produced by polymerization of alpha olefins in a hydrocarbon solvent. The entire mixture, containing polyolefin, solvent, and catalyst particles is used without separation to form dilute solutions of the polymer in crude oil or finished hydrocarbons. However, one disadvantage of such approach is the use of a solvent, which poses a shipping and handling difficulty and may constitute a hazard. In addition, the product itself forms a gel-like substance which is difficult to introduce into flowing hydrocarbon streams and which becomes extremely viscous and difficult to handle under cold weather temperature conditions, such as when injection into conduits at remote locations is required.

A second, more recent approach is to prepare the polymers as a solid material as described in patents issued to Fenton, U.S. Pat. No. 4,584,244, and to O'Mara, U.S. Pat. Nos. 4,720,397; 4,826,728; and 4,837,249; all of which deal with finely grinding drag reducing polymers to a very small particle size in an inert atmosphere below the glass transition point of the polymers and in the presence of a partitioning agent to form a multi-layered coating which holds the inert atmosphere adjacent to the particle polymers after grinding. The O'Mara patents teach it is mandatory that the reduction to fine particle size be carried out in inert atmosphere utilizing a refrigerant such as liquid nitrogen, and a coating agent while grinding the polymer to an appropriate size, where the coating agent prevents contact of oxygen with the freshly ground polymer particles.

Another recent method is set forth in U.S. Pat. Nos. 5,449,732 and 5,504,132 which deal with preparing a hydrocarbon-soluble drag reducing aqueous suspension or water alcohol suspension. The patents also teach that bulk polymerization of the poly alphaolefins produces a material which is much higher in molecular weight and which provides superior drag reduction as compared to solution polymerization, where molecular weight declines as polymer content increases. That invention solved the problem of producing such high molecular weight alkenes in a commercially satisfactory manner for use in drag reducing materials and further, provided methods for suspending such materials in an aqueous or alcohol/aqueous system.

However, these prior art processes have distinct problems, including clumping, and conversion to a solid in the aqueous suspension in extremely warm temperature conditions. In addition, it is necessary to protect the suspension against freezing in extremely cold temperature conditions.

DESCRIPTION OF THE PRIOR ART

U.S. Pat. No. 5,244,937 deals with stable nonagglomerating aqueous suspensions of oil soluble polymeric friction reducers by suspending such materials in water, together with a water-soluble thickening agent in a mixture of water or water and alcohol. U.S. Pat. Nos. 5,449,732; 5,504,131; and 5,504,132 all deal with a method of preparing ultrahigh molecular weight poly alphaolefins using a bulk polymerization system, cryogrinding in the presence of a partitioning agent, and suspending the resulting mixture in a water or water-alcohol mixture. U.S. Pat. No. 5,539,044 deals with the aqueous suspension of drag reducing polymers together with a surfactant having a hydrophilic/lipophilic balance (HLB) in a particular range to enhance suspension and durability of the suspension.

All of the prior art processes have certain drawbacks and unwanted features, including agglomeration at high temperatures, freezing at cold temperatures, and the necessity of adding an aqueous-based material into a hydrocarbon flowing stream. Such addition is not particularly troublesome in crude oil pipelines in view of the small amount injected, which generally becomes lost in the overall pipeline water content, but such materials can be objectionable in finished product pipelines even at low concentrations, as the presence of water may force the product outside specified limits.

Consequently, it would be a great advantage to provide a nonaqueous suspension of highly effective drag reducing materials for use in hydrocarbons flowing through conduits.

SUMMARY OF THE INVENTION

This invention relates to improving the flow of flowing streams of hydrocarbons, such as petroleum or finished products, in a conduit, such as a pipeline. The present invention also relates to a stable, nonagglomerating nonaqueous suspension suitable for improving flow of hydrocarbons in conduits, particularly finished product hydrocarbons in conduits.

The present invention comprises a method of forming a heat stable, nonaqueous suspension of a solid hydrocarbon soluble polyolefin friction reducing agent formed from olefins containing from 2 to 30 carbon atoms and capable of reducing drag in hydrocarbons flowing through conduits comprising (a) finely dividing the polyolefin friction reducing agent in the presence of a partitioning agent to provide a free flowing polyalphaolefin material coated with said partitioning agent, and (b) dispersing the coated polyalphaolefin particles in a substantially nonaqueous suspending medium selected from the group consisting of alcohols containing 14 or less carbon atoms and glycols containing 14 or less carbon atoms and di(propylene glycol) methyl ether, tri(propylene glycol) methyl ether, tetra(propylene glycol) methyl ether, or ethyl ethers of similar nature, wherein the partitioning agent is a fatty acid wax. Mixtures of glycol ethers can be used as suspending agents.

The finely divided non-crystalline ultrahigh molecular weight hydrocarbon soluble polyalphaolefin can be prepared by polymerizing an olefin and reducing the polyolefin thus formed to a finely divided state at cryogenic temperatures below the glass transition temperature of the solid drag reducing polyalphaolefin. Various methods of preparing such materials are described in Mack, U.S. Pat. No. 4,433,123, where the material is formed in an inert solvent, subsequently extracted from the solvent and then cryoground. Another method of preparing an even higher molecular weight material is found in U.S. Pat. No. 5,504,132 which shows the production under bulk polymerization conditions of such materials in order to achieve high molecular weights and then grinding the resulting material.

The suspension can be made in alcohols containing 14 or less carbon atoms and glycols containing 14 or less carbon atoms, or mixtures of these. Suspensions can also be made with dipropylene glycol methyl ether, tripropylene glycol methyl ether, tetrapropylene glycol methyl ether, ethyl ethers, and mixtures of these. The term "substantially free of water" is used to indicate that incidental amounts of water may be present, but do not rise to the level of providing suspension capabilities to the drag reducing suspension. Thus, the amounts of the water present are generally below 1 to 2 percent. The present invention provides a drag-reducing suspension by dispersing finely ground polymer particles throughout the non-aqueous suspending medium. Suspensions differ from the solutions of Mack as described in U.S. Pat. No. 4,433,123 in that discrete particles are present. Thus, even if the suspending medium is a partial solvent, the present invention retains discrete particles in suspension. In some embodiments, the very fine particles originally cryoground may swell or clump to a greater or lesser extent, but the suspending medium is selected or formulated to maintain discrete particles of various size and provides for such particles to be solvent-swollen where appropriate. In general, the suspending medium is a nonsolvent with respect to the polymer, or has a solubility so low with respect to the polymer particles that discrete particles are maintained. Generally, the shorter the suspending medium backbone chain, the less the solubility.

During cryogrinding of the polymer, the presence of a fatty acid wax is necessary in order to make a drag reducing suspension, with saturated fatty acid waxes preferred for the most stable drag reducing suspensions. Use of other materials as partitioning agents such as carbon blacks, or talc for example, appear to cause separation and instability of the system over long periods of time. In addition, the type of partitioning agent used will directly effect the choice of the suspending agent used. For example, the alcohol chain length, regardless of whether the alcohol is branched or linear can become longer with certain partitioning agents. Still other partitioning agents prove to be incapable of forming a suspension with any nonaqueous material tested, and consequently are unsuitable for use in the present invention.

The present invention provides significant advantages over previous water-based suspensions in that the system has freeze protection, permits a higher weight percent of active polymer in the slurry, eliminates agglomeration and heat instability problems, eliminates concerns about adding water to product pipelines, and is a simple process to carry out, not requiring surfactants and other complicated stability systems.

DETAILED DESCRIPTION OF THE INVENTION

The suspending medium of the present invention can be an alcohol, whether linear or branched, either alone or in combination with a polyethylene glycol containing up to 14 carbon atoms. While not critical to this invention, it is generally preferred that the majority of the alcohol suspending agent be a branched alcohol, as branched alcohols seem to provide some slight advantage in maintaining suspension stability. In general, alcohols up to 14 carbon atoms and polyethylene glycols of up to 14 carbon atoms can be used. However, a more preferred combination are alcohols and polyethylene glycols containing up to 10 carbon atoms. A most preferred suspending agent contains alcohols and polyethylene glycols containing up to 8 carbon atoms. Suspensions can also be made with di(propylene glycol) methyl ether, tri(propylene glycol) methyl ether, tetrapropylene glycol methyl ether, ethyl glycol ethers and mixtures of these. Of course, it will be realized by those skilled in the art that various mixtures of these various carbon atom length alcohols and polyethylene glycols and glycol ethers can be used to provide a "tailored" suspending medium for the particular polyolefin loading and service conditions. In particular, it should be noted that a particular mixture can vary depending upon basic concepts such as price, convenience or availability, as well as technical questions of stability, solubility, long-term storage, and compatibility with the flowing hydrocarbon.

Partitioning agents used when finely dividing the polyalphaolefin drag reducer are fatty acid waxes, and preferably are saturated fatty acid waxes for maximum stability. Use of other partitioning agents such as calcium stearate, and other metal stearates can be tolerated in a minor amount, but it is necessary that the weight of non-fatty acid wax partitioning agents be in a distinct minority (less than one fourth the total volume of partitioning agents) since they tend to form agglomeration products at high temperatures in nonaqueous systems. The most preferred partitioning materials (partitioning agents) are bis stearamides, primary stearamides, secondary stearamides, and mixtures of these.

Representative examples of effective materials are primary stearamides, generally a $C_{16}$–$C_{20}$ saturated acid reacted with $NH_3$; secondary stearamides, which chemically are $C_{16}$–$C_{20}$ saturated acids reacted with $NH_3$ to form amines, then further reacting $C_{16}$–$C_{20}$ saturated acids with the amine to form stearamides; and bis-stearamides, which are $C_{16}$–$C_{20}$ saturated acids reacted with diamine to form stearamides.

Partitioning agents which are most effective in nonaqueous systems are those having a saturated acid portion. Other materials which are incompletely reacted and contain unsaturated portions of the acid molecule are generally less favorable since they tend to form solid materials upon extreme heating or higher temperatures for extended times when in the presence of the non-aqueous suspending medium. The most preferred partitioning agents for long-term stability are stearamide and bis-stearamide.

In addition, depending upon the combination of alcohols used, it may be desirable to utilize a thickening agent such as hydroxy propyl cellulose to stabilize the suspension. Such thickening agents will generally comprise 1.5 percent by weight or less of the suspension.

The present invention permits solids loading in nonaqueous suspension of up to 80 percent by weight, producing paste-like consistencies using the most preferred partitioning agents, while the drag-reducing polymer will still immediately dissolve and reduce drag in hydrocarbons effectively.

Examples of alcohols useful in the practice of the present invention include linear and branched alcohols containing up to 14 carbon atoms. In a preferred mode, the alcohols will contain up to 10 carbon atoms and will in addition be combined with a glycol to prepare a suspending medium of the proper density. Generally, a ratio of alcohol to glycol will range from about 100 percent to 0 percent to about 50 percent to 50 percent respectively, although such ratios are not critical. In general, alcohols having densities which are near the density of the coated, finely ground polyalphaolefin are preferred. Other examples of effective suspending mediums are di(propylene glycol) methyl ether, tri(propylene glycol) methyl ether, tetra(propylene glycol) methyl ether, or ethyl ethers of similar nature. Mixtures of these suspending mediums can be used.

The concentration of solids in the suspending medium can be up to about 80 percent by weight. For freer flowing materials, the concentration of solids will generally be somewhat lower, about 30 to 60 percent by weight. Lower concentrations can be used, but are not as economically effective for transporting suspensions over long distances to injection points in hydrocarbon pipeline transportation systems.

The present invention is more concretely described with reference to the examples below, in which all parts and percentages are by weight, unless otherwise specified. The examples are provided only to illustrate the present invention and not to limit it.

EXAMPLE 1

A non-crystalline, high molecular weight hydrocarbon-soluble polymer is cryoground to a finely divided state in the presence of 30 percent by weight of ethylene bis-stearamide partitioning agent to produce a non-agglomerating, free-flowing powder. The powder is added to a non-aqueous suspending medium comprised of iso-octyl alcohol (80 percent by weight) and propylene glycol (20 percent by weight) to form a suspension containing 45 percent solids by weight (polymer and coating agent) to form a latex-like suspension having free-flowing characteristics. Long-term separation stability is enhanced by adding in addition 0.15 percent by weight, based on total suspension weight, of hydroxypropyl cellulose under agitation. The resulting suspension is capable of impacting drag reduction to hydrocarbon flowing through conduits. The suspension remains stable at 105° F. for a period of five weeks.

EXAMPLE 2

A non-crystalline, high molecular weight hydrocarbon-soluble polymer is cryoground to a finely divided state in the presence of 30 percent by weight of ethylene bis-stearamide partitioning agent to produce a non-agglomerating, free-flowing powder. The powder is added to a non-aqueous suspending medium comprised of di(propylene glycol) methyl ether to form a suspension containing 50 percent solids by weight (polymer and coating agent) to form a latex-like suspension having free-flowing characteristics. Long-term separation stability is enhanced by adding in addition 0.15 percent by weight, based on total suspension weight, of hydroxypropyl cellulose under agitation. The resulting suspension is capable of impacting drag reduction to hydrocarbon flowing through conduits. The suspension remains stable at 105° F. for a period of five weeks.

EXAMPLE 3

A non-crystalline, high molecular weight hydrocarbon-soluble drag reducing polydecene was cryoground to a finely divided state, in a cryogenic mill, in the presence of 30 percent by weight of each of the following coating agents in the total powder created, respectively:

Stearyl stearamide (secondary amide—alkyl and amide both saturated)

oleyl palmitamide (secondary amide—alkyl is unsaturated; amide is saturated)

Ethylene bis-oleamide (bis-amide—amides are unsaturated)

Erucamide (primary amide—amide is unsaturated)

Stearamide (primary amide—amide is saturated)

Ethylene bis-stearamide (bis-amide—amides are saturated)

The powders created from these processes were then allowed to warm back to room temperature and evaluated for their handling and/or free-flowing nature after one day period.

All the powders could be handled and maintained in a free-flowing state in order to further process by adding to suspending agents to create slurries. There were differences, however, in the "stickiness" of the powders, and their tendency, under pressure, to re-agglomerate. The best two powders from that standpoint (low stickiness, no reagglomeration) were those created with the stearamide, and with the bis-stearamide. The least attractive were those created with the bis-oleamide, oleyl palmitamide, and stearyl erucamide as they showed some tendency to re-agglomerate if squeezed by hand.

EXAMPLE 4

The powders from Example 3 were further processed into non-aqueous suspensions by adding these powders to a suspending medium consisting of 80% iso-octyl alcohol/20% propylene glycol by weight. The powders were added at a level to create suspensions consisting of 45% by weight powder. These suspensions were created by simply dumping the powders into the suspending medium and stirring for several minutes. The resulting suspensions were observed in the lab over a one-month period for their stability and flowability. The stearamide coated powder, and bis-stearamide coated suspensions remained fluid and stable, with no appreciable change, over the one-month period (and beyond). Samples subjected to warmer temperature (approximately 100° F.) also remained fluid and stable. The stearyl stearamide coated suspension remained fluid at ambient lab conditions, but a sample subjected to warmer temperature did change to a non-pourable state, over several days. The bis-oleamide and erucamide coated suspensions became very viscous over the first 24 hours and changed to a non-pouring state within a few days. The oleyl palmitamide coated suspension changed to a non-pouring state within the first 24 hours. All appeared to be viable and effective drag reducing suspensions, while in a pourable state.

EXAMPLE 5

Two thousand gallons of non-aqueous drag reducing suspension was created by cryogenically grinding a non-crystalline, high molecular weight polydecene to a finely divided state in the presence of 30% by weight of ethylene bis-stearamide in the total powder created to produce a non-agglomerating, free-flowing powder. This powder was then mixed into a suspending fluid medium consisting of iso-octyl alcohol, propylene glycol, and hydroxypropyl cellulose to create a final suspension consisting of:

45.0% drag reducing powder
44.0% iso-octyl alcohol
11.0% propylene glycol
0.05% hydroxypropyl cellulose This suspension was shipped to an arctic climate (in a non-heated, non-agitated container) and injected into a 185 mile-long segment of a 47-inch I.D. pipeline carrying crude oil to effect drag reduction. At a 25 ppm, by volume, injection rate of the suspension, over 50% average drag reduction was achieved over the entire 185-mile distance of test pipeline. The remaining suspension was kept outdoors in the arctic climate for over 2 months, after which further injection tests were conducted. With ambient temperatures below –20° F., the suspension remained fluid and pumpable, and provided drag reduction in crude oil.

While certain embodiments and details have been shown for the purpose of illustrating this invention, it will be apparent to those skilled in this art that various changes and modifications may be made herein without departing from the spirit or the scope of the invention.

We claim:

1. A method of reducing turbulent drag in a hydrocarbon liquid stream flowing though conduits, which comprises:
   (a) forming a solid hydrocarbon soluble polyolefin friction reducing agent from olefins containing from 2 to 30 carbon atoms;
   (b) finely dividing said soluble polyolefin friction reducing agent in the presence of a partitioning agent to provide a free flowing, polyalphaolefin material, said partitioning agent being a fatty acid wax;
   (c) dispersing the free-flowing polyalphaolefin particles in a substantially nonaqueous suspending fluid medium selected from the group consisting of alcohols containing 14 or less carbon atoms, glycols and glycol-ethers; and
   (d) adding said suspension to said hydrocarbon liquid stream in an amount of up to 100 ppm of said reducing agent to reduce friction during turbulent flow through said conduits.

2. A method of using a heat stable, nonaqueous suspension of a solid hydrocarbon soluble polyolefin friction reducing agent to reduce turbulent drag in a hydrocarbon liquid stream flowing through conduits, comprising:
   (a) finely dividing said solid polyolefin friction reducing agents in the presence of a partitionig agent to provide a free flowing, polyalphaolefin material, said partitioning agent being a fatty acid wax;
   (b) dispersing the polyalpha olefin particles in a substantially nonaqueous suspending fluid medium selected from the group consisting of alcohols containing 14 or less carbon atoms, glycols and glycol-ethers; and
   (c) adding said suspension to said hydrocarbon liquid stream to reduce friction during turbulent flow through conduits.

3. A method of forming a heat stable, nonaqueous suspension of a solid hydrocarbon soluble polyolefin friction reducing agent formed from olefins containing from 2 to 30 carbon atoms and capable of reducing turbulent drag in a hydrocarbon liquid stream flowing through conduits, comprising:
   (a) finely dividing said solid polyolefin friction reducing agent in the presence of a partitioning agent to provide a free flowing, polyalphaolefin material, said partitioning agent being a fatty acid wax; and
   (b) dispersing the polyalphaolefinparticles in a substantially nonaqueous suspending fluid medium selected from the group consisting of alcohols containing 14 or less carbon atoms, glycols and glycol-ethers.

4. A method as described in claim 3 wherein the fatty acid wax is a saturated fatty acid wax.

5. A method as described in claim 4 wherein the fatty acid wax is selected from the group consisting of bis stearamides, primary stearamides, secondary stearamides, and mixtures of these.

6. A method as described in claim 5 wherein the saturated fatty acid wax is stearamide or bis-stearamide or mixtures of these.

7. A method as described in claim 6 including the additional step of adding a thickening agent to said suspending fluid medium.

8. A method as described in claim 6 wherein the majority of the alcohol suspending medium is a branched alcohol.

9. A method as described in claim 6 wherein solids loading of the suspension is up to 80% by weight.

10. A method as described in claim 3 wherein the glycol-ether suspending agent medium is at least one glycol ether selected from the group consisting of di(propylene glycol) methyl ether, tri(propylene glycol) methyl ether, tetra (propylene glycol) methyl ether, or mixtures of these.

11. A nonaqueous, heat stable, non-agglomerating composition capable of reducing turbulent drag in hydrocarbon fluids flowing through conduits, comprising:
   (a) a finely divided solid polyolefin friction reducing agent formed from olefins containing from 2 to 30 carbon atoms;
   (b) sufficient fatty acid wax partitioning agent on said polyolefin reducing agent to yield a stable suspension when said polyolefin friction reducing agent and said partitioning agent are combined with a suspending fluid medium; and (c) said suspending fluid medium selected from the group consisting of alcohols containing 14 or fewer carbon atoms and glycols containing fewer than 14 carbon atoms, and glycol-ethers, and wherein said composition is adapted to be added to said hydrocarbon fluids to reduce turbulent drag during said flow through conduits.

12. A composition as described in claim 11 wherein the fatty acid waxes are saturated fatty acid waxes.

13. A composition as described in claim 12 wherein the saturated fatty acid wax is stearamide, bis-stearamide or mixtures of these.

14. A composition as described in claim 13 wherein in addition a thickening agent is added.

15. A composition as described in claim 14 wherein the thickening agent is hydroxypropylcellulose.

16. A composition as described in claim 13 wherein the suspending medium comprises primarily branched alcohols.

17. A composition as described in claim 13 wherein the suspending medium comprises di(propylene glycol) methyl ether, tripropylene glycol) methyl ether, tetra(propylene glycol) methyl ether, or mixtures of these.

18. A composition as described in claim 13 wherein the solids loading of the suspension is up to 80% of total suspension weight.

19. A nonaqueous, heat stable, non-agglomerating composition capable of reducing turbulent drag in a hydrocarbon stream flowing through conduits, said composition comprising:

(a) a finely divided solid polyolefin friction reducing agent formed from olefins containing from 2 to 30 carbon atoms;

(b) a fatty acid wax partitioning agent;

(c) a thickening agent; and (d) a suspending fluid agent selected from the group consisting of alcohols containing 14 or fewer carbon atoms and glycols containing fewer than 14 carbon atoms, and glycol-ethers, and wherein said agent is primarily a branched alcohol, wherein the solids loading of the composition is up to 80 percent of total composition weight and wherein said composition is adapted to be added to said hydrocarbon stream to reduce turbulent drag.

20. A composition as described in claim 19 wherein the fatty acid waxes are saturated fatty acid waxes.

21. A composition as described in claim 20 wherein the saturated fatty acid wax is stearamide, bis-stearamide or mixtures of these.

22. A composition as described in claim 19 wherein the thickening agent is hydroxypropylcellulose.

* * * * *